United States Patent
Oka

(10) Patent No.: US 10,167,833 B2
(45) Date of Patent: Jan. 1, 2019

(54) ROLLER LIFTER AND METHOD OF MANUFACTURING THE SAME

(71) Applicant: OTICS CORPORATION, Nishio-shi, Aichi (JP)

(72) Inventor: Hideki Oka, Nishio (JP)

(73) Assignee: OTICS CORPORATION, Nishio-Shi, Aichi (JP)

( * ) Notice: Subject to any disclaimer, the term of this patent is extended or adjusted under 35 U.S.C. 154(b) by 0 days.

(21) Appl. No.: 15/413,473

(22) Filed: Jan. 24, 2017

(65) Prior Publication Data

US 2017/0218905 A1     Aug. 3, 2017

(30) Foreign Application Priority Data

Jan. 28, 2016 (JP) .................. 2016-013958

(51) Int. Cl.
| | | |
|---|---|---|
| *F02M 59/46* | (2006.01) | |
| *F02M 59/10* | (2006.01) | |
| *F02M 59/44* | (2006.01) | |
| *F16H 53/06* | (2006.01) | |

(52) U.S. Cl.
CPC .......... *F02M 59/46* (2013.01); *F02M 59/102* (2013.01); *F02M 59/44* (2013.01); *F16H 53/06* (2013.01); *F01L 2107/00* (2013.01); *F02M 2200/8053* (2013.01)

(58) Field of Classification Search
CPC ................ F02M 59/46; F02M 59/102; F02M 2200/8053; F01L 2107/00; F01L 1/14; F01L 1/143
See application file for complete search history.

(56) References Cited

U.S. PATENT DOCUMENTS

| | | | | |
|---|---|---|---|---|
| 3,886,780 | A * | 6/1975 | Falk ...................... | B21D 53/42 70/404 |
| 9,422,834 | B2 * | 8/2016 | Fujii ...................... | F01L 1/14 |
| 2010/0294219 | A1 | 11/2010 | Prokop | |
| 2011/0116945 | A1 | 5/2011 | Shibata et al. | |
| 2011/0158835 | A1 | 6/2011 | Yabuuchi et al. | |

(Continued)

FOREIGN PATENT DOCUMENTS

| | | | |
|---|---|---|---|
| DE | 1 099 795 B | 2/1961 | |
| DE | 4128813 A1 * | 3/1993 | ............... F01L 1/25 |
| DE | 10 2006 059 716 A1 | 6/2008 | |

(Continued)

OTHER PUBLICATIONS

Extended EP Search Report for EP 17000085.5 dated Jul. 4, 2017 (5 pages).

*Primary Examiner* — Thomas C Diaz
(74) *Attorney, Agent, or Firm* — Smith, Gambrell & Russell, LLP

(57) ABSTRACT

A roller lifter includes a lifter body having a cylindrical peripheral wall and a roller rotatably mounted on the lifter body via a shaft member and brought into contact with a cam. The peripheral wall has an outer periphery formed with a sliding surface which is slid on an inner wall of a cylinder. The lifter body has a rotation stopper formed by outwardly protruding a part of the peripheral wall, and an opening formed in another part of the peripheral wall which another part is radially opposed to the rotation stopper. The opening is open so that the rotation stopper oppositely faces the opening.

1 Claim, 6 Drawing Sheets

(56) References Cited

U.S. PATENT DOCUMENTS

2013/0340695 A1    12/2013  Fujii et al.
2016/0281667 A1*    9/2016  Berruet ............... F02M 59/102

FOREIGN PATENT DOCUMENTS

JP      2010-249082 A    11/2010
JP      2014-001706 A     1/2014
WO      2010/026463 A1    3/2010

* cited by examiner

ROLLER LIFTER AND METHOD OF MANUFACTURING THE SAME

CROSS-REFERENCE TO RELATED APPLICATIONS

This application is based upon and claims the benefit of priority from the prior Japanese Patent Application No. 2016-13958 filed on Jan. 28, 2016, the entire contents of which are incorporated herein by reference.

BACKGROUND

1. Technical Field

The present invention relates to a roller lifter and a method of manufacturing the roller lifter.

2. Related Art

Japanese Patent Application Publication No. JP-A-2014-1706 discloses a roller lifter including a lifter body having a sliding surface slidable on an inner wall of a cylinder and a roller rotatably mounted via a shaft support pin to the lifter body and brought into contact with a cam. The lifter body has a rotation stopper formed to protrude outward, a forward sliding surface located in front of the rotation stopper with respect to a sliding direction and a rear sliding surface located at the rear of the rotation stopper. The rotation stopper is formed by pressing a punch against an inner periphery of a peripheral wall of the lifter body and bending the inner periphery outward.

The above-described structure can improve the rigidity of the lifter body and ensure a longer front-rear dimension of the sliding surface with the result that axial runout (cocking) of the roller lifter relative to the inner wall of the cylinder can be reduced.

In the above-described roller lifer, however, in the forming of the rotation stopper, the punch is axially inserted inside the peripheral wall of the lifter body and then turned to a radial direction inside the peripheral wall. Thereafter, a movement direction of the punch is specified so that a part of the peripheral wall is punched out with the punch. This complicates the mold construction, resulting in a problem of increase in manufacturing costs.

SUMMARY

The present invention was made in view of the foregoing circumstances and an object thereof is to provide a roller lifter which can reduce increase in the manufacturing costs and a method of manufacturing the roller lifter.

In one aspect, the present invention provides a roller lifter including a lifter body having a cylindrical peripheral wall. The peripheral wall has an outer periphery formed with a sliding surface which is slid on an inner wall of a cylinder. The roller lifter also includes a roller rotatably mounted on the lifter body via a shaft member and brought into contact with a cam. The lifter body has a rotation stopper formed by outwardly protruding a part of the peripheral wall, and an opening formed in another part of the peripheral wall which another part is radially opposed to the rotation stopper, the opening being open so that the rotation stopper oppositely faces the opening.

In another aspect, the invention provides a method of manufacturing the roller lifter as specified above. In the method, in forming the rotation stopper, a rotation stopper forming punch member which is radially movable is moved inside the peripheral wall through the opening thereby to press a part of the peripheral wall outward.

The rotation stopper can be formed by radially moving the punch member from outside the peripheral wall through the opening. This forming manner does not necessitate a complicated mold construction and can accordingly reduce increase in the manufacturing costs. Furthermore, the rotation stopper can be formed in an expeditious manner with the result that the productivity can be improved.

DETAILED DESCRIPTION

Figure 1:
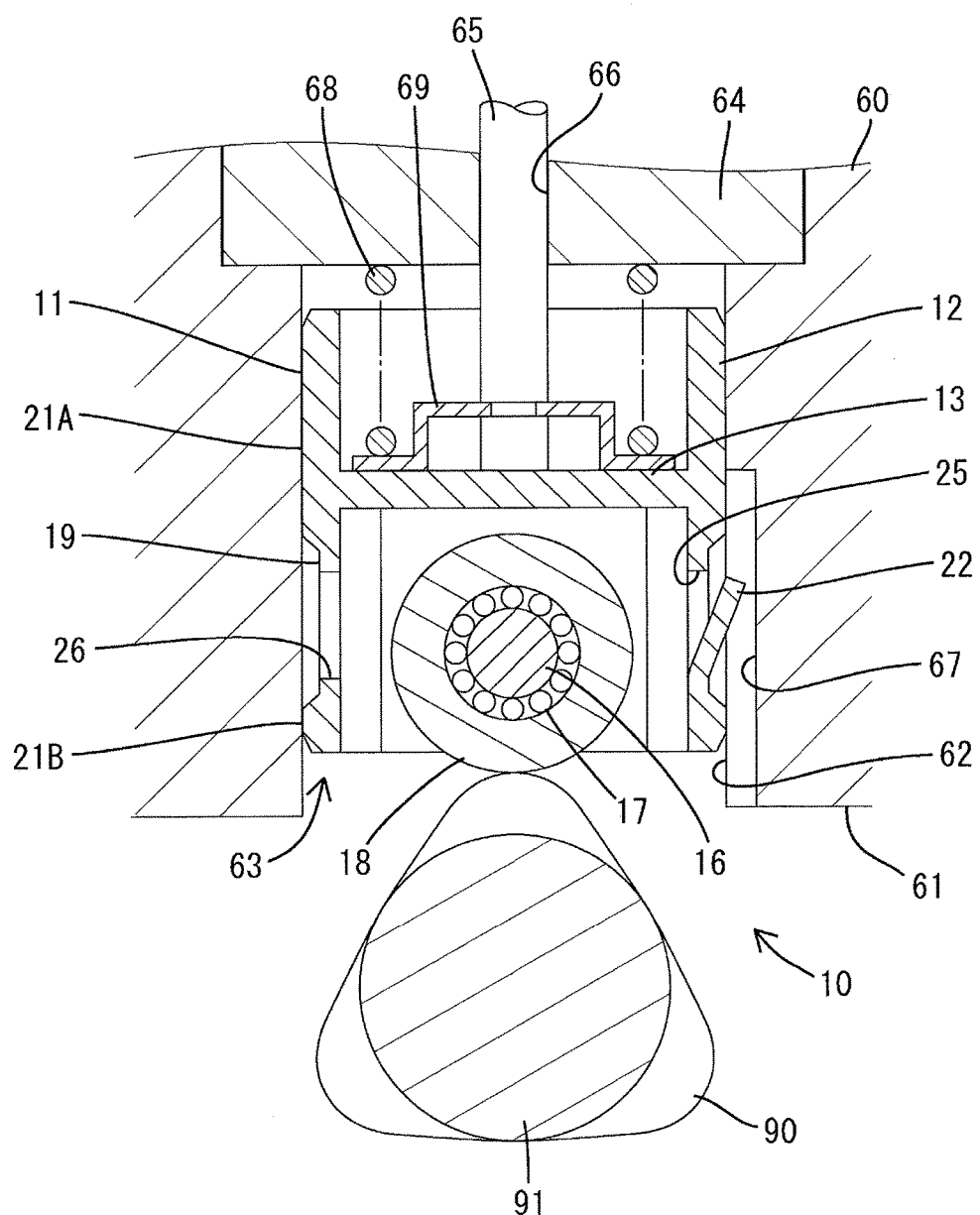
FIG. 1 is a sectional view of a fuel supply pump including the roller lifter of a first embodiment.

A first embodiment will be described with reference to FIGS. 1 to 5. A roller lifter 10 of the first embodiment exemplifies a pump lifter mounted in a fuel supply pump 60 of an internal combustion engine of an automotive vehicle. The roller lifter 10 includes a lifter body 11 which is slidable on an inner wall 62 of a cylinder 61 of the pump 60.

Figure 2:
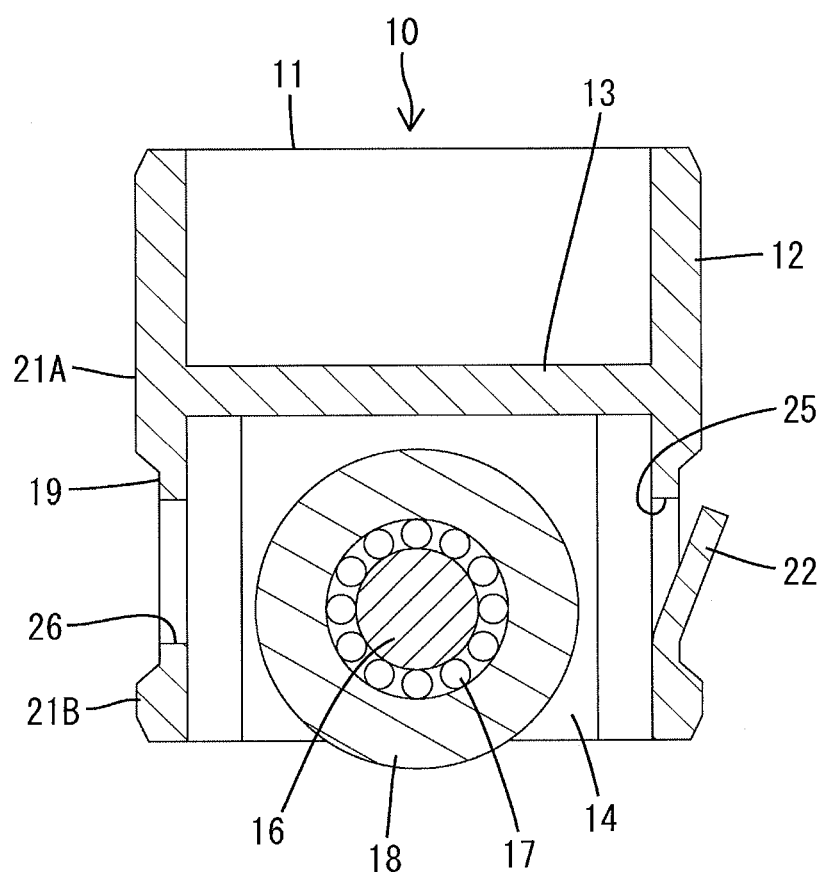
FIG. 2 is a sectional view of the roller lifter.

Referring to FIG. 2, the lifter body 11 has a peripheral wall 12 and a partition wall 13. The peripheral wall 12 is formed into a generally cylindrical shape and has an upper open end and a lower open end. The partition wall 13 is connected to an up-down middle part of an inner periphery of the peripheral wall 12. An interior of the cylindrical peripheral wall 12 is closed by the partition wall 13 and divided by the partition wall 13 into an upper interior and a lower interior.

Figure 3:
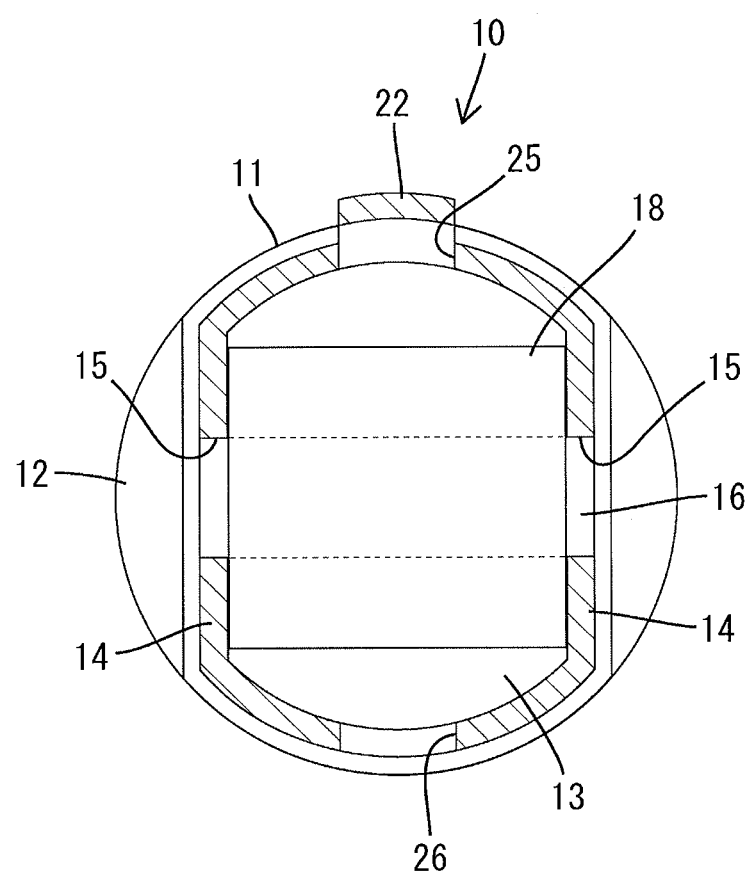
FIG. 3 is a sectional view of the roller lifer as viewed from below.

The peripheral wall 12 has a pair of opposite walls 14 located in a lower half thereof. The opposite walls 14 are formed by squeezing peripheral parts and are disposed so as to be opposite substantially in parallel to each other, as illustrated in FIG. 3. The opposite walls 14 have radially extending coaxial insertion holes 15 extending through the opposite walls 14 respectively. A shaft member 16 is radially disposed between the opposite walls 14. The shaft member 16 has two ends which are inserted into the insertion holes 15 and then swaged thereby to be fixed to the opposite walls 14, respectively.

A roller 18 is rotatably supported via bearings 17 by the shaft member 16, as shown in FIG. 1. The roller 18 has an outer periphery in contact with a cam 90. The cam 90 is provided on a cam shaft 91 which is in parallel to the shaft member 16. The roller 18 has a lower end disposed to be exposed downward from a lower end of the lifter body 11.

The peripheral wall 12 has an outer periphery having a recess 19 and sliding surfaces 21A and 21B, as shown in FIG. 2. The recess 19 is configured to have a reduced diameter over an entire circumference and located in the lower part of the peripheral wall 12, in which part the opposite walls 14 are also included. The sliding surfaces 21A and 21B are disposed on upper and lower sides (front and rear ends with respect to a sliding direction) sandwiching the recess 19 on the outer periphery of the peripheral wall 12 respectively. The sliding surfaces 21A and 21B are slidable on an inner wall 62 of the cylinder 61. The upper sliding surface 21A ensures a larger up-down region as compared with the lower sliding surface 21B.

The peripheral wall 12 has a rotation stopper 22 located to correspond to the recess 19. The rotation stopper 22 protrudes obliquely upward in a cantilevered manner from a root portion to a distal end. The rotation stopper 22 is formed by outwardly pressing a plate-shaped part 24 (see FIG. 4) located between generally angular U-shaped cuts 23 formed in the recess 19. The peripheral wall 12 is also formed with a through hole 25 together with the rotation stopper 22. The rotation stopper 22 has a distal end located radially outside the sliding surfaces 21A and 21B.

The peripheral wall 12 has an opening 26 located in a recess 19 so as to be radially opposed to the rotation stopper 22. In other words, the rotation stopper 22 and the opening 26 are disposed at both radial sides of an axial center of the peripheral wall 12, and in more detail, at both ends in the direction substantially perpendicular to a direction in which both walls 14 are opposed to each other (an axial direction of the shaft member 16). When the rotation stopper 22 is radially projected in the peripheral wall 12, an entire projection domain of the rotation stopper 22 is set to fall within an inside of the opening 26. The opening 26 radially extends through a part of the peripheral wall 12 thereby to be open at an inner periphery and an outer periphery (the recess 19) of the peripheral wall 12. The opening 26 has a rectangular section corresponding to a projection shape of the rotation stopper 22 and is configured as a looped opening having a continuous (unbroken) periphery.

Figure 4:
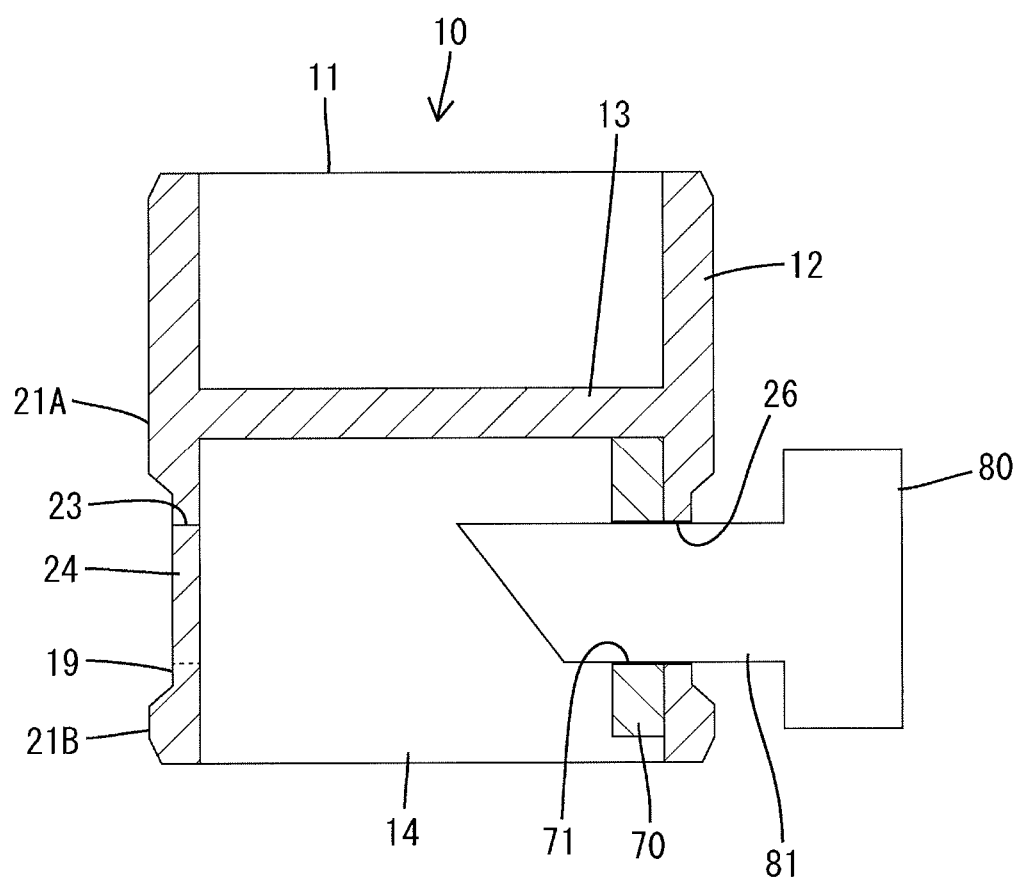
FIG. 4 is a sectional view of the roller lifter, explaining a step of forming an opening.

The following describes a method of manufacturing the opening 26 and the rotation stopper 22 of the roller lifter 10. Referring to FIG. 4, firstly, the opening 26 is formed using an opening forming punch member 80. A receiving mold 70 is inserted into the interior of the peripheral wall 12 from below prior to punching by the punch member 80. The receiving mold 70 has a window 71 formed at a portion thereof corresponding to a forming position of the opening 26. The receiving mold 70 is set so that a part except for the window 71 abuts against the inner periphery of the peripheral wall 12 while being inserted into the interior of the peripheral wall 12.

Subsequently, the punch member 80 is caused to penetrate through the peripheral wall 12 with the result that the peripheral wall 12 is radially punched through. The punch member 80 has a bar-shaped portion 81 which radially extends and has a cross-sectional shape corresponding to the opening 26. Furthermore, the bar-shaped portion 81 has a distal end formed into a sharp-pointed shape. When the punch member 80 is radially moved so that the distal end of the bar-shaped portion 81 breaks through the opposing portion of the peripheral wall 12, whereby the bar-shaped portion 81 penetrates through the peripheral wall 12 with the result that the opening 26 is punched out and formed. In this case, the bar-shaped portion 81 is inserted through the window 71 of the receiving mold 70 and then guided. Furthermore, the receiving mold 70 can reduce burrs caused in an inner peripheral edge of the opening 26 and can prevent the peripheral wall 12 from deformation. A cutting edge may be formed along the outer periphery of the opening 26 prior to the punching by the punch member 80.

Figure 5:
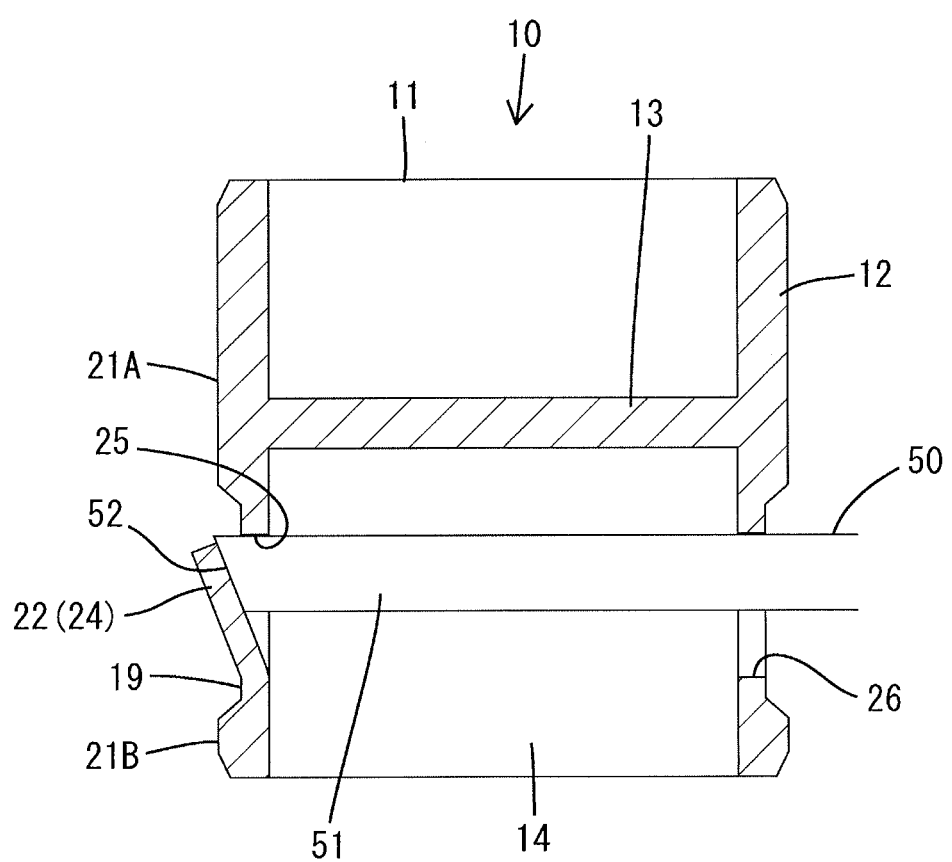
FIG. 5 is a sectional view of the roller lifter, explaining a step of forming a rotation stopper.

Subsequently, the rotation stopper 22 is formed using a rotation stopper forming punch member 50 as shown in FIG. 5. The peripheral wall 12 has generally angular U-shaped cuts 23 previously formed along the outer edge of the rotation stopper 22. The punch member 50 has an elongated bar-shaped portion 51 extending radially. The bar-shaped portion 51 has a distal end formed with a downwardly inclined pressing surface 52 corresponding to the rotation stopper 22.

The punch member 50 is radially moved so that the bar-shaped portion 51 enters the interior of the peripheral wall 12 through the opening 26. In this case, the bar-shaped portion 51 is disposed along the radial direction so that the bar-shaped portion 51 straddles the inside and an outside of the peripheral wall 12. In this state, the distal end of the bar-shaped portion 51 abuts against the plate-shaped part 24 located between the cuts 23 from inside. Further radial movement of the punch member 50 causes the distal end of the bar-shaped portion 51 to deform the plate-shaped part 24 of the peripheral wall 12 so that the plate-shaped part 24 is pressed downward. As a result, the through hole 25 is formed, and the rotation stopper 22 is bent so as to be inclined along a pressing surface 52 of the bar-shaped portion 51. The rotation stopper 22 may be configured to be supported by a supporting mold (not shown) from behind when pressed by the punch member 50 thereby to be inclined.

The above-described manufacturing method necessitates two types of punch members 50 and 80. On the other hand, a common punch member may be radially moved so that the opening 26 and the rotation stopper 22 are formed at one time. Furthermore, when the lifter body 11 is a cast product, the opening 26 may be formed simultaneously with casting of the peripheral wall 12.

Next, the following describes the structure and operation of the fuel supply pump 60 including the roller lifter 10. The cylinder 61 has a sliding hole 63 extending in the up-down direction as illustrated in FIG. 1. The cylinder 61 has an inner wall 62 formed on an inner periphery of the sliding hole 63. The sliding hole 63 has an upper end closed by a block 64. The block 64 has a through hole 66 through which an engagement member 65 slidably extends as will be described later. The cylinder 61 has a rotation stopper groove 67 extending along the sliding hole 63 (the inner wall 62) in the up-down direction. The rotation stopper groove 67 has a lower end which is open.

The upper part of the lifter body 11 houses the engagement member 65 such as a plunger, a spring member 68 such as a coil spring and a retainer 69. The engagement member 65 is fixed to the retainer 69, which is supported by the partition wall 13. The retainer 69 is located opposite the block 64 of the cylinder 61. The spring member 68 is elastically held between the block 64 and the retainer 69.

Upon rotation of the cam 90 with drive of the engine, the lifter body 11 is reciprocated in the up-down direction in a stroke according to an amount of lift of the cam 90. Furthermore, the engagement member 65 is reciprocated in the up-down direction together with lifter body 11, so that operating oil is pressure-fed from a pressure chamber (not shown) located above the engagement member 65. In this period, the sliding surfaces 21A and 21B of the lifter body 11 are slid on the inner wall 62 of the cylinder 61, and the rotation stopper 22 is caused to enter the interior of the rotation stopper groove 67 and is displaced in the up-down direction in this state. The rotation stopper 22 is kept in the rotation stopper groove 67, so that the lifter body 11 is prevented from being rotated about the axis in the sliding hole 63.

The peripheral wall 12 of the lifter body 11 has the upper and lower sliding surfaces 21A and 21B on the outer periphery thereof in the first embodiment, whereby a long sliding region in the up-down direction can be ensured with the result that axial runout (cocking) of the lifter body 11 can be reduced.

Furthermore, since the peripheral wall 12 of the lifter body 11 has the recess 19 located between the sliding surfaces 21A and 21B, the recess 19 is separated from the inner wall 62 of the cylinder 61, so that the opening 26 open to the recess 19 is not substantially caught on the inner wall 62 with the result that smooth reciprocal movement of the roller lifter 10 is guaranteed.

Furthermore, the rotation stopper 22 can easily be formed by the rotation stopper forming punch member 50 radially moving from outside the peripheral wall 12 through the opening 26. This necessitates no complicated mold construction and can accordingly reduce the manufacturing costs. Moreover, since the rotation stopper 22 can be formed in an expeditious manner, the productivity can be improved.

Furthermore, the opening 26 is formed into the looped opening having a continuous entire periphery, and is not open at the upper and lower ends (front and rear ends in the sliding direction) of the peripheral wall 12. Accordingly, for example, in a finishing process, the upper and lower sliding surfaces 21A and 21B of the peripheral wall 12 and the like can be engaged with grind stone, shoe or the like with no trouble with the result that a polishing process can smoothly be carried out.

Furthermore, when the rotation stopper 22 is radially projected in the peripheral wall 12, the entire projection domain of the rotation stopper 22 is configured to fall within the inside of the opening 26. As a result, since the bar-shaped punch member 50 penetrates through the peripheral wall 12, the rotation stopper 22 can be formed without any trouble.

Second Embodiment

Figure 6:
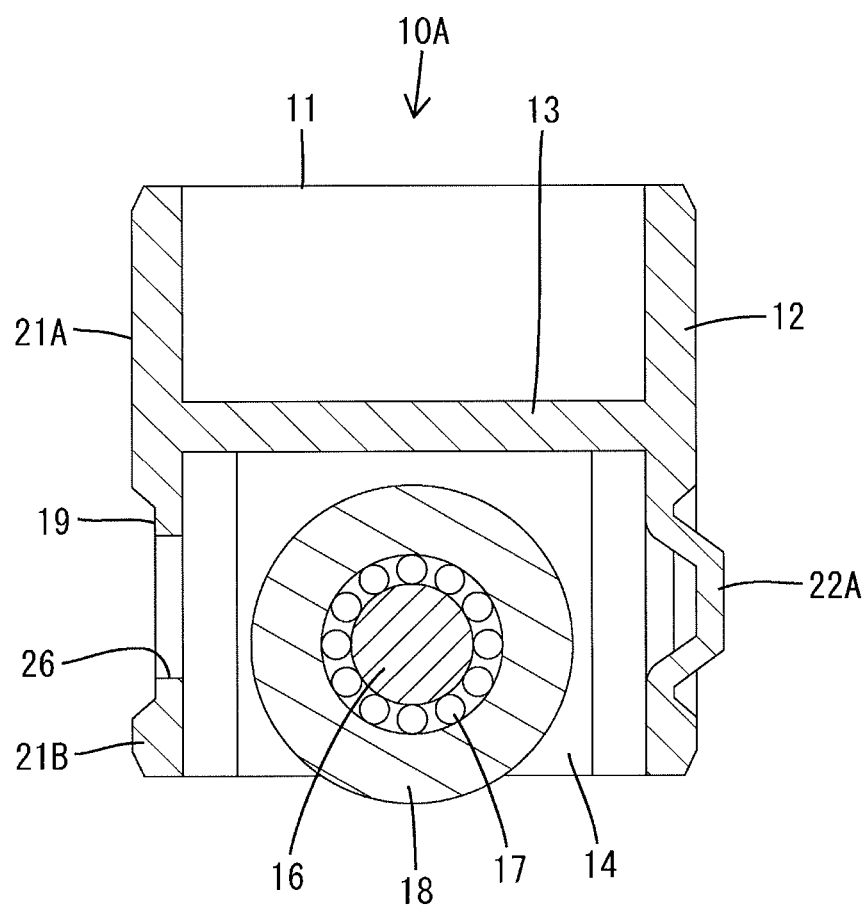
FIG. 6 is a sectional view of the roller lifer of a second embodiment.

FIG. 6 illustrates a roller lifter 10A of a second embodiment. The second embodiment differs from the first embodiment in the configuration of the rotation stopper 22A.

The rotation stopper 22A is formed by bulging a part of the peripheral wall 12 outward from the surroundings. More specifically, the rotation stopper 22A is formed to be bulged so that an entire circumference thereof is continuous to a part of the peripheral wall 12 without being separated from the surroundings. In forming the rotation stopper 22A, the inner periphery of the peripheral wall 12 is pressed by the distal end surface of a rotation stopper forming punch member (not shown), so that the corresponding part of the peripheral wall 12 is deformed to be bulged outward along the distal end surface of the punch member. In this case, the punch member is configured not to punch through the peripheral wall 12. Thus, the second embodiment differs from the first embodiment in that the through hole 25 is not formed in the peripheral wall 12.

In the second embodiment, the rotation stopper forming punch member is radially moved through the opening 26 in the same manner as in the first embodiment so that the rotation stopper 22A is formed to be continuously bulged from a part of the peripheral wall without a break. Accordingly, since the rotation stopper 22A is formed into a curved profile so as not to have any edge, the inner wall 62 of the cylinder 61 can avoid damage caused by the rotation stopper 22A. Furthermore, the rigidity of the rotation stopper 22A can be improved.

Other Embodiments

Other embodiments will briefly be described in the following.
(1) In the first embodiment, the peripheral wall may be formed with no cuts, and the rotation stopper may be formed simultaneously with the making of cuts in the peripheral wall by the distal end of the punch member.
(2) The rotation stopper and the opening may be formed in the upper part of the peripheral wall (a part above the partition wall with respect to the up-down direction).
(3) The opening may be formed into a non-looped shape open at the upper or lower end of the peripheral wall.
(4) The rotation stopper may be of a double-supported type that is connected to a part of the peripheral wall in the up-down or right-left direction.
(5) The invention may be applied to a valve lifter which abuts against a stem (the engagement member) of a valve which is capable of opening and closing an intake port and an exhaust port of an engine.

What is claimed is:

1. A method of manufacturing a roller lifter that comprises:
   a lifter body having a cylindrical peripheral wall, the peripheral wall having an outer periphery formed with a sliding surface configured to be slid on an inner wall of a cylinder, and
   a roller rotatably mounted on the lifter body via a shaft member and configured to be brought into contact with a cam,
   wherein the lifter body has a rotation stopper formed in a part of the peripheral wall so as to protrude outward, together with a through hole, and an opening formed in another part of the peripheral wall, said another part is radially opposed to the rotation stopper, the opening being open so that the rotation stopper oppositely faces the opening; and
   wherein an upper end of the through hole and an upper end of the opening are arranged radially coaxially with each other at a same level;
   wherein a receiving mold having a window is inserted inside the peripheral wall and set so as to abut against an inner periphery of the peripheral wall, and subsequently, an opening forming punch member which is radially movable is moved through the peripheral wall to be inserted into the window of the receiving mold, whereby the opening is formed, and
   wherein in forming the rotation stopper and the through hole, a rotation stopper forming punch member which is radially movable is moved inside the peripheral wall through the opening thereby to press a part of the peripheral wall outward.

* * * * *